United States Patent
Meka et al.

(10) Patent No.: US 6,399,707 B1
(45) Date of Patent: Jun. 4, 2002

(54) IMPACT COPOLYMER AND PLASTOMER BLEND

(75) Inventors: Prasadarao Meka, Seabrook, TX (US); Jeffrey Valentage; Paul J. Burke, both of Royal Oak, MI (US); Kris K. Killinger, South Lyon, MI (US); James T. Luce, Plymouth, MI (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/718,463

(22) Filed: Nov. 20, 2000

Related U.S. Application Data

(60) Provisional application No. 60/236,676, filed on Sep. 29, 2000.

(51) Int. Cl.$^7$ ............................. C08L 23/00; C08L 23/04
(52) U.S. Cl. ................................. 525/191; 525/240
(58) Field of Search .................... 525/191, 240

(56) References Cited

U.S. PATENT DOCUMENTS

| | | |
|---|---|---|
| 4,218,339 A | 8/1980 | Zucchini et al. |
| 4,328,122 A | 5/1982 | Monte et al. |
| 4,395,360 A | 7/1983 | Albizatti et al. |
| 4,473,660 A | 9/1984 | Albizatti et al. |
| 4,535,068 A | 8/1985 | Job |
| 4,634,735 A | 1/1987 | Thiersault et al. ............ 525/88 |
| 4,990,477 A | 2/1991 | Kioka et al. ............... 502/107 |
| 4,990,479 A | 2/1991 | Ishimaru et al. ............ 502/125 |
| 5,026,798 A | 6/1991 | Canich ....................... 526/127 |
| 5,159,021 A | 10/1992 | Kioka et al. ................ 525/247 |
| 5,198,401 A | 3/1993 | Turner et al. |
| 5,278,272 A | 1/1994 | Lai et al. .................. 526/348.5 |
| 5,362,808 A | 11/1994 | Brosius, et al. ............. 525/88 |
| 5,576,374 A | 11/1996 | Betson et al. .............. 524/451 |
| 5,681,897 A | 10/1997 | Silvis et al. ............... 525/150 |
| 5,688,866 A | 11/1997 | Silvis et al. ............... 525/127 |
| 5,856,406 A | 1/1999 | Silvis et al. ............... 525/240 |
| 6,087,459 A | 7/2000 | Miro et al. ................. 526/128 |
| 6,111,039 A | 8/2000 | Miro et al. ................. 526/128 |

FOREIGN PATENT DOCUMENTS

| | | |
|---|---|---|
| EP | 0 129 368 A1 | 12/1984 |
| EP | 0 228 543 A2 | 7/1987 |
| EP | 0 490 353 A2 | 6/1992 |
| EP | 0 531 054 A2 | 3/1993 |
| GB | 1156813 | 8/1966 |
| GB | 2 046 763 A | 11/1980 |
| JP | H5-98093 | 4/1993 |
| WO | WO 92/01747 | 2/1992 |
| WO | WO 94/06859 | 3/1994 |

OTHER PUBLICATIONS

"Ultralow Density Polyethylene Blends with Polypropylene", Young Keon Lee, et al., *Polymer Engineering and Science*, mid Jul. 1991, vol. 31, No. 13, pp. 944–953.

*Primary Examiner*—Nathan M. Nutter
(74) *Attorney, Agent, or Firm*—David J. Alexander; Kevin M. Faulkner

(57) ABSTRACT

A polymeric material suitable for fabrication into an article and particularly a polymeric material suitable for fabrication into an article suitable for receiving paint is provided. The polymeric material may be a blend of impact copolymer and plastomer. The impact copolymer includes between 95 and 78 wt % homopolypropylene and between 5 and 22 wt % of ethylene-propylene rubber, wherein ethylene propylene rubber may have less than about 50 wt % ethylene. The plastomer may be an ethylene/hexene plastomer. The ethylene/hexene plastomer may have a density in the range from 0.88 to 0.915 g/cc and a melt index (dg/min) from 0.8 to 10. The impact copolymer may be present in the blend in a range of 95 to 70 wt % and the ethylene/hexene plastomer may be present in the blend in a range from 5 to 30 wt %. The propylene, ethylene and hexene components may be present in the blend in respective ranges of 73.2 to 84.2 wt %, 14.3 to 23.1 wt % and 1.5 to 3.7 wt %.

9 Claims, No Drawings

IMPACT COPOLYMER AND PLASTOMER BLEND

This Application is based on Provisional Application U.S. Ser. No. 60/236,676 filed Sep. 29, 2000.

FIELD OF THE INVENTION

This invention relates to polymer blends. More particularly, the invention relates to polymer blends useful for molding applications for forming molded articles. More particularly, the invention relates to polymer blends useful for injection molding for forming polymeric articles such as automotive exterior components and particularly, painted automotive exterior components. Examples of automotive exterior components include, but are not limited to bumper fascia, wheel flares, exterior molding, and step pads.

SUMMARY OF THE INVENTION

A polymeric material suitable for fabrication into an article and particularly a polymeric material suitable for fabrication into an article suitable for receiving paint is provided. The polymeric material may be a blend of impact copolymer and plastomer. The impact copolymer includes between 95 and 78 wt % homopolypropylene and between 5 and 22 wt % of ethylene-propylene rubber, wherein ethylene propylene rubber may have less than about 50 wt % ethylene. The plastomer may be an ethylene/hexene plastomer. The ethylene/hexene plastomer may have a density in the range from 0.88 to 0.915 and a melt index (dg/min) from 0.8 to 10. The impact copolymer may be present in the blend in a range of 95 to 70 wt % and the ethylene/hexene plastomer may be present in the blend in a range from 5 to 30. The propylene, ethylene and hexene components may be present in the blend in respective ranges of 73.2 to 84.2 wt %, 14.3 to 23.1 wt % and 1.5 to 3.7 wt %.

DETAILED DESCRIPTION OF THE INVENTION

Test protocols and definitions are set out in Table 1, and described in more detail in the specification.

TABLE 1

Test Protocols

| Property | Units | Definition or Test |
| --- | --- | --- |
| Density | g/cm$^3$ | ASTM D-792 |
| Molecular weight distribution | None | None |
| Tensile at Yield | Psi | ASTM-D638 |
| Elongation at Yield | % | ASTM D-638 |
| Secant Modulus (1%) | Psi | ASTM D-790A |
| Gardner Impact at −29° C. | in–lbs. | ASTM D-5420G |
| Instrumented Impact Strength | ft–lbs. | ASTM-D-3763 |
| Room Temp. Notched Izod | ft–lb./in | ASTM D-256 |

Physical Property Measurements:

Melt Flow Rate (MFR):

MFR was measured according to ASTM D 1238 test method, at 230° C. and 2.16 kg load, and is expressed as dg/min or g/10 min.

Tensile Strength at Yield and Elongation at Yield:

Tensile strength at yield was measured according to ASTM D638, with a crosshead speed of 50.8 mm/min, and a gauge length of 50.8 mm, using an Instron machine.

Flexural Modulus:

The flexural modulus was obtained according to ASTM D790A, with a crosshead speed of 1.27 mm/min (0.05 in/min), and a support span of 50.8 mm, using an Instron machine.

Gardner Impact Strength and Failure Mode:

The Gardner impact strength was measured according ASTM D5420, Method G, Procedure GC, at −29° C. and on 90-mm diameter and 3.175-mm thickness disks. The failure mode is classified as shatter, brittle, and or ductile, based on the appearance and condition of the impacted disk. For example, the classification of "shatter" is appropriate when the test disk fractures into multiple pieces (often the number pieces can range from 10 to 15) on impact by the falling weight. The classification of "brittle" is appropriate when the impacted disk exhibits many radial cracks extending from the area of the impact point. These radial cracks do not propagate all the way to the outer periphery of the disk and portions of the disk defined by the radial cracks do not separate. The classification of "ductile" is appropriate when, after impact, an area of the disk contacted by the weight protrudes from or appears pushed out from the disk surface. The protruding area is generally unsymmetrical and exhibits a crack on one side. Portions of the disk surface defining the extended area appear rough and fibrillar in nature. The failure modes of shatter-to-brittle, brittle-to-ductile, are combinations of two different types of failure modes exhibited by the disk. The failure mode of brittle-to-ductile, which is between shatter and ductile, is characterized by radial cracks extending from the protruding area. However, portions of the disk defined by the radial cracks do not separate. While the failure modes described above are based on human judgment, rather than a quantitative number from an instrumental evaluation, these failure modes are reproducible and provide both the polymer producer and the parts fabricator with reliable information relative to the suitability of polymers for various applications. An individual trained and experienced in this test procedure can classify different polymeric materials using the Gardner impact test procedure with accuracy.

Notched Izod Impact Strength:

The room temperature notched Izod impact strength (RTNI) is measured according to ASTM D256 test method. The impact strength equipment is made by Testing Machines Inc.

Instrumented Impact (Dynatup):

The instrumented impact strength is measured by ASTM D3763 using a Dynatup model 8250. A weight of 25 pounds and a speed of 15 miles per hour are used to measure the failure mode and the total energy. The weight is adjusted such that the velocity slowdown is less than 20%.

The failure mode is defined as ductile (D) if the load vs. displacement curve is symmetric and there are no radial cracks in the sample and the tup pierces through the sample. The ductile-brittle (DB) failure mode is defined as the mode where on the load-displacement curve, the load goes through the maximum, and suddenly drops to zero and there are radial cracks in the sample. And, brittle-ductile (BD) failure mode is defined as the condition where in the load-displacement curve, the load falls well before reaching a maximum and the sample breaks into multiple pieces. The desirable failure mode is completely ductile at the specified temperatures.

Paint Adhesion Testing

This test is one of the simplest and most widely recognized test methods in the automotive industry utilized to determine relative adhesion of paint on plastic. This test involves making a series of cuts in the coating, applying a pressure-sensitive tape over the cuts, and removing the tape and quantifying the degree of paint adhesion. Specifically, the paint system used is the following: Adhesion promoter/Base Coat/Clear Coat (Redspot LE16610XM/Redspot 106S21945RRN (1K White BC)/Redspot 379S21654EPCX (2K Clear). These tests were carried out, data for which is in Table 7.

Moisture Resistance

Same criteria for Paint Adhesion Testing. This testing is designed to determine the adequate cure of the paint (example, over-cured paint can lead to poor humidity/moisture resistance).

Aggressive Adhesion and Scuff Resistance Testing

This is a two-part test designed to quantify the performance of a TPO (thermoplastic olefin) relative to paint durability. The aggressive adhesion is designed to evaluate the paintability to penetrate into the TPO, and the scuff abrasion portion of the test is designed to evaluate adhesive (% removal) cohesive integrity of the TPO to withstand scuffing and marring.

Rating: Both the aggressive adhesion and scuff are rated in terms of percent (%) removal. Results of less than 20% for both indicate a desirable performance criteria, and results of less than 2% removal for both indicates excellent results.

Gasoline Resistance

This test is conducted to help determine the propensity of solvents to penetrate the TPO substrate. This propensity is quantified by immersion of crosshatched topcoated panel in CE-10 gasoline over a 15-minute period at room temperature and continued up to 60 minutes of duration and evaluated every 15 minutes (i.e., 15, 30, 45 and 60 min). CE-10 is a mixture of the following: 10/90 ethanol/reference fuel C, reference fuel C is a 50/50 blend of toluene/iso-octane by weight.

Polymeric materials may be employed in a variety of applications such as for example, household appliances, fabrics (woven and nonwoven), containers, pipes, and automotive parts. In the case of automotive parts, depending upon the physical properties of a particular polymeric material, the polymeric material may be used to form articles suitable for use in the automobile cabin area (these articles are often referred to as "interior trim parts") or may be used to form articles suitable for use on the automobile exterior. Automobile exterior components which may be fabricated from polymeric materials include, but are not limited to bumper fascia, wheel flares, exterior molding, and step pads.

Generally, suitable polymeric materials for interior trim parts exhibit certain physical properties, such as high stiffness (>150 kpsi), high heat distortion temperature (HDT) (>90C), MFR >20 dg/min, and room temperature notched Izod (RTN) impact resistance >2.0 ft-lbs./in. Additionally, because the molding process for manufacturing interior trim parts is designed to create or impart a surface texture to the final product and the polymers used to form interior trim parts are pigmented, paintability of the polymeric material is not a concern when selecting a suitable polymer for interior trim applications.

Polymeric materials suitable for use in painted, exterior applications such as bumper fascia generally exhibit different physical properties than polymers used for interior trim parts. For example, polymeric materials useful for painted, exterior applications may have a stiffness in the range of 90–140 kpsi, ductility up to −29° C., good paintability, and MFR in the range of 11–15 dg/min.

It should be noted that for purposes of fabrication, higher MFR (greater than 15 dg/min) polymeric materials are more desirable. However, for purposes of product performance and safety, relatively low MFR range (less than 15 dg/min) polymeric are used. This is so because low temperature ductility and no break RTNI values, generally required by the automotive industry for exterior and particularly, painted, exterior applications, are difficult to achieve with higher MFR polymeric materials. For purposes of fabrication, a low MFR polymeric material, such as 11 dg/min is more difficult and expensive to process than a higher MFR polymeric material. For example, when processing by injection molding, the peak injection pressure is significantly lower with a 25 MFR article as compared to an 11 or even a 15 MFR article. Injection molding at lower peak injection pressure is desirable because it requires a less expensive, lower clamp tonnage machine to mold a particular part. Additionally, at lower pressures, wear and tear on the equipment and the machine is less.

In addition, unlike current interior trim articles to which a surface texture has been imparted, exterior trim articles are generally fabricated with a smooth surface. A durable, smooth, uniform surface is desirable for the application of paint and appearance. Thus, while polymeric materials that exhibit flow marks or "tiger strips" may be suitable for interior trim use (because the flow marks are masked by the imparted surface texture or hidden from view), they are not suitable for exterior trim applications. As such, without analysis of the individual polymeric material for the particular intended application, the certification of a polymeric material for interior applications alone is not indicative of the suitability of such polymeric materials for exterior applications and vice versa.

Embodiments of the invention relate to polymer blends suitable for injection molding fabrication and exterior applications and painted applications and more particularly for painted, exterior applications and more particularly for painted, exterior automotive applications. These polymer blends include (a) an impact copolymer (ICP) and (b) an ethylene plastomer. The blend includes from 95 to 70, desirably from 93 to 75 and more desirably from 92 to 80 weight percent ("wt %") of an impact copolymer and from 5 to 30, desirably from 7 to 25 and more desirably form 8 to 20 wt % of the ethylene plastomer. Examples of automotive exterior components which may be painted, include, but are not limited to bumper fascia, wheel flares, exterior molding, and step pads.

The impact copolymer may be a reactor blend of between 95 and 78, desirably between 90 and 80, and more desirably between 88 and 80 wt % of homopolypropylene and between 5 and 22, desirably between 10 and 20, and more desirably between 12 and 20 wt % of ethylene-propylene rubber. The ethylene propylene rubber is generally amorphous and is composed generally less than about 50 wt % ethylene, desirably of between 45 and 50, more desirably between 46 and 49, and most desirably between 47 and 48 wt % ethylene. The impact copolymer may be made in series reactors for a more intimately mixed blend. The homopolypropylene component of the impact copolymer may have a melt flow rate range of 1–275 g/10 min while the melt flow rate range of the ethylene propylene rubber component of the impact copolymer may have a melt flow rate in the range of 5–150 g/10 min. Commercially available ICPs suitable for blending with plastomers include PP7715E2 and PP7715E4 which are available from Exxon-Mobil Chemical Company.

Ethylene plastomers may be formed from a copolymer of ethylene and one or more $C_3$–$C_{16}$ alpha olefins. An ethylene plastomer suitable for blending with the ICP may be a plastomer that includes an ethylene/hexene copolymer. The ethylene plastomer may also be a linear ethylene/α-olefin polyolefin and have a density from 0.88 to 0.915, and desirably from 0.88 to 0.895 and a melt index (dg/min) from 0.8 to 10, and desirably from 0.8 to 3.5. Linear ethylene/α- olefin polyolefin means that the olefin polymer has a homogeneous short branching distribution and does not have any long chain branching. The molecular weight distribution of such products is <3.0, and $I_{10}/I_2$ (melt index measured at 10 kg load/melt index measured at 2.16 kg load) ranges between 4–8. The so called single site metallocene catalyst systems used by ExxonMobil Company are used to make homogeneous linear ethylene/α-olefins.

The ethylene plastomer may be produced by high pressure, non-gas phase polymerization using metallocene catalysts. An example of a commercially available plastomer suitable for blending with ICPs is EXACT™ 4150 (a ethylene-hexene plastomer), available from ExxonMobil Chemical Company.

When the ethylene plastomer includes an ethylene/hexene copolymer, the ranges of the individual monomer components (in wt. %) within the ICP/plastomer blend may be:

Ethylene 14.3%–23.1%
Propylene 73.2%–84.2%
Hexene 1.5%–3.7%

The Impact Copolymer

The homopolymer components of the in situ polymerization of polypropylene and poly(ethylene-co-propylene) of the impact copolymer generally possess a broad molecular weight distribution and simultaneously display high flexural moduli, normally associated with highly crystalline polymers, and a high melt flow rate (MFR), normally associated with less stereoregular polymers. When sequential electron donors, as described in greater detail below, are used, the homopolymer components are formed in a process where, for example, propylene is sequentially subjected to an initial polymerization in the first series of reactors and in the presence of a Ziegler-Natta catalyst and a first electron donor material. This polymerization is continued in a second reactor where a subsequent or second polymerization reaction occurs in the presence of the same Ziegler-Natta catalyst but with a second electron donor material. The second electron donor material may be more stereoregulating than the first electron donor material. The second electron donor material may also dominate the first electron donor material. The homopolypropylene polymerization within the first and second reactors, such as bulk liquid reactors, is followed by ethylene-propylene opolymerization in one or more gas phase reactors. The final product is typically called an impact copolymer ("ICP").

When electron donors blends, as described in greater detail below, are used, the homopolymer polymerization takes place in the presence of a blend of two or more donors. Polymerization of the homopolymer component(s) may also occur in one or more reactors. For example, the homopolypropylene polymerization within one or more reactors, such as bulk liquid reactors, may be followed by ethylene-propylene copolymerization in one or more gas phase reactors. Again, the final product is typically called an ICP.

Impact Copolymer Catalyst

Examples of catalysts systems useful in the formation of the impact copolymer are Ziegler-Natta catalysts systems described in U.S. Pat. Nos. 4,990,479 and 5,159,021 which are incorporated by reference. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesium-hydrocarbon composition of step (2) with additional titanium halide.

The Ziegler-Natta co-catalyst may be an organoaluminum compound that is halogen free. Suitable halogen free organoaluminum compounds are, in particular, branched unsubstituted alkylaluminum compounds of the formula $AIR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477, which is incorporated herein by reference. The same or different Ziegler-Natta catalyst(s) may be used in both the initial and subsequent polymerization steps.

Electron donors are typically used in two ways in the formation of Ziegler-Natta catalysts and catalyst systems. An internal electron donor may be used in the formation reaction of the catalyst as the transition metal halide is reacted with the metal hydride or metal alkyl. Examples of internal electron donors include amines, amides, ethers, esters, aromatic esters, ketones, nitrites, phosphines, stilbenes, arsines, phosphoramides, thioethers, thioesters, aldehydes, alcoholates, and salts of organic acids. In conjunction with an internal donor, an external electron donor is also used in combination with a catalyst. External electron donors may affect the level of stereoregularity and MFR in polymerization reactions. External electron donor materials include organic silicon compounds, e.g. tetraethoxysilane (TEOS), dicyclopentyldimethoxysilane (DCPMS) and, and propyltriethoxysilane (PTES). Internal and external-type electron donors are described, for example, in U.S. Pat. No. 4,535,068, which is incorporated herein by reference. The use of organic silicon compounds as external electron donors are described, for example, in U.S. Pat. Nos. 4,218, 339, 4,395,360, 4,328,122 and 4,473,660, all of which are incorporated herein by reference. However, the term "electron donor", as used herein refers specifically to external electron donor materials.

Polymerization Process for the Synthesis of Impact Copolymer

Typical Polymerization Conditions for Sequential Donors. As described in U.S. Pat. No. 6,111,039, incorporated herein by reference, two different donors are used, namely tetraethoxy silane (TEOS) in the first liquid bulk reactor and TEOS and dicyclopentyldimethoxy silane (DCPMS) in the second bulk liquid reactor. In the first bulk liquid reactor, the donor TEOS produces a high MFR polypropylene, and in the second bulk liquid reactor the combination of TEOS and DCPMS produces a low MFR polypropylene which is attributed to the dominance of DCPMS donor in presence of TEOS.

The hydrogen and triethylaluminum (TEAL) concentrations in the first bulk liquid reactor are 900 and 57 ppm, respectively. In the second liquid bulk reactor the hydrogen and TEAL concentrations are 1550 and 57 ppm, respectively. The TEOS concentration in the first liquid bulk reactor is 21.4 ppm, resulting in a polypropylene MFR of between 130–140 dg/min, and the concentrations of TEOS and DCPMS in the second liquid bulk reactor are 21.5 and 36.6 ppm, resulting in a de-blended MFR of between 20–22 dg/min or a blended MFR of the two reactors of 69–75 dg/min. The production splits in the two liquid bulk reactors were 65:35 (first:second). The hydrogen/monomer ratio in the gas phase reactor is 4.5 mole %, ethylene monomer to (ethylene plus propylene) monomer ratio is 0.35, and the reactor pressure is 190 psig (1.41 MPa). The ethylene in the ethylene-propylene copolymer is about 45–55 wt. %, and a total copolymer level of between about 15 to 19 wt. %. The final MFR of the ICP is between about 35–38 dg/min. This system is hereinafter termed the "sequential donor" polymerization system.

The sequential donor polymerization system was used below for Example C-1, and Examples 7 through 12.

Polymerization Conditions for Donor Blends. As described in U.S. Pat. No. 6,087,459, incorporated by reference, the catalyst and donor blend are chosen such that a relationship between a first melt flow rate of a homopolymer formed by polymerizing an alpha-olefin monomer in the presence of a Ziegler-Natta catalyst system and a first electron donor (MFR (a)), and a second melt flow rate of a homopolymer formed by polymerizing an α-olefin monomer in the presence of the Ziegler-Natta catalyst system and a second electron donor (MFR (b)), is defined by the equation;

$$1.2 \leq \log [MFR(b)/MFR(a)] \leq 1.4.$$

The α-olefin may be chosen from the group consisting of a propylene, 4-methyl-1-pentene, 1-hexene, 1-butene, 1-hexene, 1-decene, 1-dodecene, 1-nonene, and mixtures thereof Where a copolymer is made, the comonomer may include ethylene. DCPMS may be the first electron donor, and propyltriethoxysilane ("PTES") may be the second electron donor. When using DCPMS and PTES, these electron donors may be mixed together such that the mixture of donors includes about 2.5 mol. % to less than 50 mol. % of a DCPMS and greater than 50 mol. % of PTES. A suitable supported Ziegler-Natta catalyst component is a catalyst solid sold by TOHO Titanium Company, Ltd. under the trade name of THC-C-133.

Certain supported Ziegler-Natta catalysts may be used in combination with a co-catalyst. The co-catalyst is preferably an organoaluminum compound that is halogen free. Suitable halogen free organoaluminum compounds are, in particular, branched unsubstituted alkylaluminum compounds of the formula $AIR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477, which is incorporated herein by reference. A particularly suitable organoaluminum co-catalyst is triethylaluminum (TEAL).

The typical polymerization conditions employing electron donor blends can include the hydrogen and triethylaluminum (TEAL) concentrations in the bulk liquid reactors of 2850 and 75 ppm, respectively. The temperature of the liquid bulk reactors is 70° C. The PTES/DCPMS blend concentration in the liquid bulk reactors is 35 ppm, resulting polypropylene blended MFR of 72 dg/min. The production splits in the two liquid bulk reactors are 65:35 (first:second). The hydrogen/monomer ratio in the gas phase reactor 2.9 mole %, and the ethylene monomer to (ethylene plus propylene) monomer ratio is about 0.39, to result in a final MFR of 33–38 dg/min. The gas phase reactor temperature is 70° C. and pressure of 190 psig. The total copolymer level is between 16 to 20 wt %. This system is hereinafter termed the "donor blend" polymerization system.

The donor blend polymerization system was used below for Example C-2 and for Examples 13–15.

The Plastomer

Plastomers useful for blending with the ICP are ethylene and hexene-1 copolymers having a density in the range of 0.88 to 0.915 g/cc and a melt index (MI) of between 0.80 and 10. An example of a commercially available ethylene and hexene-1 copolymer plastomer is EXACT™ 4150, available from ExxonMobil Chemical Company.

The plastomer may be made by a number of processes, including low pressure, gas phase, fluidized bed, slurry or solution processes. The catalysts used for the polymerization are generally of the metallocene-alumoxane, metallocene-ionizing activator, or conventional Ziegler-Natta types. Such catalysts are well known. Thus, useful catalysts are those disclosed in EP 1229368, U.S. Pat. Nos. 5,026,798 and 5,198,401 incorporated herein by reference. The plastomer will have a Mw//Mn less than about 3, and a composition distribution breadth index above about 50%, preferable, above 60%, more preferable above about 65%, and $I_{10}/I_2$ in the range of 4–7.

Blending ICP and Plastomer

The plastomer may be present in the ICP/plastomer blend in the range of from 5–40 weight percent in one embodiment. In another embodiment, the ICP/plastomer blend is in the range of from 10–30 weight percent. In yet another embodiment, the ICP/plastomer blend is in the range of from 10–20 weight percent. In yet another embodiment, the ICP/plastomer blend is in the range of from 16–19 weight percent based on the total weight of the blend. The MFR of the blend will be above 12 in one embodiment, above 15 dg/min in another embodiment, and in the range of from about 15 to 28 dg/min in yet another embodiment. A plaque molded from the blend will have a 1% secant modulus exceeding about 140,000 psi. in one embodiment. In another embodiment, the 1% secant modulus is above 150,000. A plaque molded from the blend will also have a Gardner impact at −29° C. exceeding about 200 in-lb. in one embodiment, and exceeding 225 in-lb. in another embodiment, and exceeding about 250 in-lb. in yet another embodiment. A plaque molded from the blend will also have a "no break" (NB) reading for RTNI, a good surface appearance (the absence of flow marks when observed without assistance of magnification), and an "excellent" result from Adhesion and Taber tests.

Fillers

Fillers may be added to the ICP/Plastomer blend. However, for many applications, the ICP/Plastomer blend may be substantially free of fillers, including reinforcing fillers. By substantially free it is intended that the blend compositions described have less than 10 weight percent of such fillers, based on the total weight of the ICP/ethylene copolymer blend, preferably less than 5 weight percent, more preferably less than 3 weight percent.

However, the use of well-known additives may also be included, such as pigments, anti-static materials, mold release additives, ultra violet stabilizers and other such components well known to those of ordinary skill in the art.

Blends

The blending of polypropylene impact copolymer (ICP) and polyethylenes with different compositions were done on a Reifenhauser single screw extruder having screw diameter of 60 mm and length/diameter (L/D) of 24:1.

One of the considerations for choosing blend components in particular, the type of polyethylene is the transferability of the pellets in pipes to the compounding equipment (extruders). The free flowability and non-stickiness of the polymer pellets is important and one of the considerations used in this invention. All the polyethylenes made using metallocene catalyst systems and used in this invention are non-sticky and free flowing and no coating material used for the pellets.

EXAMPLES

Impact copolymers used in the examples are shown in Table 2. Samples D through D-3 are ICPs produced under the above described polymerization conditions for sequential donors. Sample F is an ICP produced under the above described polymerization conditions for donor blends. Table 3 shows the polyethylenes used in the embodiments of the invention. Various examples reflect possible embodiments of the invention, wherein C-1 and C-1 are ICPs without the added plastomer, and Examples (EX) 1 through 15 are the ICP and plastomer blends. Tables 4–6 show the physical properties of Examples C-1 and C-2 (ICP without added plastomer), and EX-1 through EX-15 of the blends. Finally, Tables 7 and 8 show paintability and adhesion test results for an embodiment of the invention, Example 8 as compared to commercial products.

In the various examples, the blends (or ICPs alone) contain certain additives to enhance the performance of the articles. In Example C-1, and Examples 7 through 12, the following were added in the indicated percentage weight by total weight of the blend (or ICP) and additives: Irganox 3114 (0.11 wt %) (Ciba Specialties Chemicals), di-stearyl thiodipropionate (0.075%) (Great Lakes Chemical Corp.), Irgafos 168 (0.06 wt %) (Ciba Specialties Chemicals), Kemamide U (0.05 wt %) (Witco Chemical Corp.), and sodium benzoate (0.02 wt %) (Mallinckrodt Specialty Chemicals). In Example C-2, and Examples 13–15, the following were added in the indicated percentage weight: Irganox 1010 (0.15 wt %) (Ciba Specialties Chemicals), Ultranox 626A (0.05 wt %) (GE Specialty Chemicals), hydro talcite (DHT4A) (0.03 wt %) (Kyowa Chemical Industry Corp.), and sodium benzoate (0.1 wt %). The Irganox additives are used as primary antioxidants. The Irgafos, di-stearyl thiodipropionate and Ultranox additives are secondary antioxidants. The Kemamide U additive is a slip agent. The hydro talcite additive is a catalyst neutralizer. The sodium benzoate is a nucleating agent.

TABLE 2

Impact Copolymer Samples

| Sample ID | MFR (dg/min) | EP rubber Level (wt %) | Ethylene in the EP (wt %) | Comments |
|---|---|---|---|---|
| D | 33 | 17.4 | 48 | Nucleated |
| D-1 | 35 | 17 | 53.7 | Nucleated |
| D-2 | 34 | 17.1 | 54.3 | Nucleated |
| D-3 | 35 | 16.8 | 52.5 | Nucleated |
| F | 31 | 17.5 | 49 | Nucleated |

TABLE 3

Polyethylenes used in the invention

| Grade | Density/MI (g/cc)/(dg/min) | Co-monomer | Catalyst | $I_{10}/I_2$ |
|---|---|---|---|---|
| EXACT ™ 4150 | 0.895/3.5 | Hexene | Metallocene | 5.7 |
| EXACT ™ 8201 | 0.882/1.0 | Octene | Metallocene | 9.5 |
| EXACT ™ 2M055 | 0.882/3.0 | Octene | Metallocene | 8.2 |

TABLE 4

Physical properties of the blends of ICP's and polyethylenes

| Composition and Property | C-1 | EX-1 | EX-2 | EX-3 | EX-4 | EX-5 | EX-6 | EX-7 | EX-8 |
|---|---|---|---|---|---|---|---|---|---|
| ICP D | 100 | | | | | | | 85.5 | 83 |
| ICP D-1 | | 87 | 83 | | | | | | |
| ICP D-2 | | | | 87 | 83 | | | | |
| ICP D-3 | | | | | | 87 | 83 | | |
| Ethylene in EPR (wt %) | 48 | 53.7 | 53.7 | 54.3 | 54.3 | 52.5 | 52.5 | 48 | 48 |
| EXACT ™-4150 ($C_6^=$) (wt %) | 0 | 13 | 17 | 13 | 17 | 13 | 17 | 14.5 | 17 |
| MFR (dg/min) | 35 | 28 | 25.6 | 26.3 | 25.2 | 27.5 | 25.4 | 28 | 28 |
| Tensile at Yield, psi (MPa) | 3760 | 3535 | 3437 | 3518 | 3394 | 3502 | 3397 | 3401 | 3314 |
| | (26) | (24.4) | (23.7) | (24.3) | (23.4) | (24.2) | (23.4) | (23.4) | (22.9) |
| Elongation at Yield, % | 5.2 | 5.9 | 5.4 | 6.0 | 5.2 | 5.7 | 7.3 | 8.7 | 10 |
| 1% Sec Flex, kpsi (MPa) | 194 | 181 | 175 | 178 | 167 | 178 | 169 | 168 | 158 |
| | (1338) | (1248) | (1207) | (1228) | (1152) | (1228) | (1167) | (111159) | (1097) |
| Gardner −29° C., in − lbs. (J) | 162 | 232 | 269 | 225 | 277 | 233 | 265 | 286 | 291 |
| | (18) | (26) | (30) | (25) | (31) | (26) | (30) | (32) | (33) |
| Failure Mode[1] at −29° C. | S | DB | DB | DB | D | DB | D, DB | D | D |
| RTNI[2], ft − lbs./in (KJ/m²) | 1.5 | 1.9 | 2.2 | 1.9 | 3.1 | 1.99 | 2.2 | 3.3 | 10 |
| | (8) C | (10) C | (12) C | (10) C | (16) C | (10) C | (12) C | (17) C | NB (53) |
| Instrumented Impact @ −18° C. (ft − lbs.)[3] | 11 | 27 | 28 | 28 | 28 | 29 | 27 | 26 | 25 |
| | (15) | (37) | (38) | (38) | (38) | (39) | (36) | (35) | (34) |
| | 4 BD | 4 D, 1 DB | 5 D | 5 D | 5 D | 5 D | 5 D | 5 D | 5 D |
| Instrumented Impact @ −29° C. (ft − lbs.)[3] | 6 | 33 | 28 | 32 | 33 | 29 | 30 | 32 | 33 |
| | (8) | (45) | (38) | (44) | (45) | (39) | (40) | (44) | (44) |
| | 5 BD | 4 D, 1 DB | 3 D, 2 DB | 4 D, 1 BD | 5 D | 3 D, 2 DB | 4 D, 1 DB | 5 D | 5 D |

[1]Failure Modes: S - Shatter; B - Brittle; D - Ductile; S-B-D - Shatter-Brittle-Ductile; BD - Brittle-Ductile; DB - Ductile Brittle; C - complete break; and NB - No Break.
[2]RTNI - Room Temperature Notched Izod Impact.
[3]Measured at 15 mph and the energy is the total.

TABLE 5

Physical properties of the blends of ICP's and polyethylenes

| Composition and Property | C-1 | EX-9 | EX-10 | EX-11 | EX-12 |
|---|---|---|---|---|---|
| PP 7715E2 (wt %) | 100 | 87 | 83 | 87 | 83 |
| Ethylene in EPR (wt %) | 48 | 48 | 48 | 48 | 48 |
| EXACT ™-8201 ($C_8^=$) (wt %) | 0 | 14.5 | 17 | | |
| EXACT ™ 2M055 ($C_8^=$) (wt %) | | | | 14.5 | 17 |
| MFR (dg/min) | 35 | 25 | 24 | 28 | 27 |
| Tensile at Yield, psi (MPa) | 3760 (26) | 3223 (22) | 3163 (22) | 3278 (23) | 3225 (22) |
| Elongation at Yield, % | 5.2 | 6.8 | 6.7 | 7.4 | 7.7 |
| 1% Sec Flex, kpsi (MPa) | 194 (1338) | 163 (1124) | 163 (1124) | 162 (1117) | 163 (1124) |
| Gardner −29° C., in − lbs. (J) | 162 (18) | 289 (33) | 262 (30) | 267 (30) | 262 (30) |
| Failure Mode[1] at −29° C. | S | D, DB | D, DB | D, DB | D, DB |
| RTNI[2], ft − lbs./in (KJ/m$^2$) | 1.5 (8) C | 2.6 (14) C | 3.2 (17) C | 2.7 (14) C | 2.8 (15) C |
| Instrumented Impact @ −18° C. (ft − lbs.)[3] | 11 (15) 5 BD | 29 (39) 5 D | 28 *38) 5 D | 29 (39) 4 D, 1 DB | 29 (39) 4 D, 1 DB |
| Instrumented Impact @ −29° C. (ft − lbs.)[3] | 6 (8) 5 BD | 31 (42) 5 D | 31 (42) 5D | 33 (45) 5D | 32 (43) 5D |

[1]Failure Modes: S - Shatter; B - Brittle; D - Ductile; S-B-D - Shatter-Brittle-Ductile; BD - Brittle-Ductile; DB - Ductile Brittle; C - Complete Break; and NB - No Break.
[2]RTNI - Room Temperature Notched Izod Impact.
[3]Measured at 15 mph and the energy is the total.

TABLE 6

Physical properties of the blends of ICP's and polyethylenes

| Composition and Property | C-2 | EX-13 | EX-14 | EX-15 |
|---|---|---|---|---|
| ICP-F (wt %) | 100 | 87 | 85 | 83 |
| Ethylene in EPR (wt %) | 49 | 49 | 49 | 49 |
| EXACT ™-4150 ($C_6^=$) (wt %) | 0 | 13 | 15 | 17 |
| MFR (dg/min) | 31 | 28 | 27.6 | 26.2 |
| Tensile at Yield, psi (MPa) | 3810 (26) | 3270 (23) | 3140 (22) | 3110 (21) |
| Elongation at Yield, % | 5.5 | 6.2 | 7.0 | 7.6 |
| 1% Sec Flex, kpsi (MPa) | 184 (1269) | 161 (1110) | 155 (1069) | 151 (1041) |
| Gardner −29° C., in − lbs. (J) | 153 (17) | 235 (27) | 307 (35) | 312 (35) |
| Failure Mode[1] at −29° C. | S | DB | D, DB | D |
| RTNI[2], ft − lbs./in (KJ/m$^2$) | 1.8 (10) C | 2.50 (13) C | 10 NB (53) | 12 NB (63) |
| Instrumented Impact @ −18° C. (ft − lbs.)[3] | 19 (26) 2, DB, 3 BD | 29 (39) 5 D | 29 (39) 5 D | 29 (40) 5 D |
| Instrumented Impact @ −29° C. (ft − lbs.)[3] | 7.3 (10) 5 BD | 31 (41) 4 D, 1 DB | 33 (45) 5 D | 32 (43) 5 D |

[1]Failure Modes: S - Shatter; B - Brittle; D - Ductile; S-B-D - Shatter-Brittle-Ductile; BD - Brittle-Ductile; DB - Ductile Brittle; C - Complete Break; and NB - No Break.
[2]RTNI - Room Temperature Notched Izod Impact.
[3]Measured at 15 mph and the energy is the total.

TABLE 7

Paintability tests with Example 8

| Test | Method | Average of 3 Samples of EX-8 |
|---|---|---|
| Paint adhesion (% Removal) | FLTM B1 106-01 | 0 |
| Gasoline soak | Modified Juntunen's | |
| 15 min | % Removal | 0 |
| 30 min | | 0 |
| 45 min | | 26.7 |
| 60 min | | 100 |
| Instrumented Impact at 0° C., Energy at Max load, 5 MPN (ft − lbs.) | ASTM D3763 | 7.4 (5 Brittle-Ductile) |
| 96 hr Moisture Resistance | GM4456P | |
| Appearance | Visual | Slight yellowing, blistering, no gloss change |
| Cross hatch (%) removal | GMP9071P, Method A | 0 |
| Cross cut (% Adhesion) | GMP9071P, Method B | 100 |
| Dime Scrape | GMP9506 | Good adhesion |
| Heat resistance 7 days at 70° C. | | |
| Appearance | Visual | Slight yellowing |
| Cross hatch (%) removal | GMP9071P, Method A | 0 |
| Cross cut (% Adhesion) | GMP9071P, Method B | 100 |
| Dime Scrape | GMP9506 | Good adhesion |
| Thermal shock | FLTM BI 107-05, Removal (mm$^2$) | 0 |
| Rating | | 20 |
| Visual defects | | None |

TABLE 8

Aggressive adhesion and Taber test for Example 8 as compared to commercial resins

| Test | Montell CA 186 | Solvay D-160 | Ex-8 |
|---|---|---|---|
| Aggressive Adhesion (after 5 tape pulls), paint removal | 0.0% | 0.0% | 0.1% |
| Taber @ 82° C., 100 cycles, if failure, cycle is noted, paint removal | 0.0% | <1% (72th cycle) | 0.0% |
| Rating | Excellent | Excellent | Excellent |
| 1% Sec Flexural Modulus, kpsi (MPa) | 90 (620) | 110 (760) | 150 (1035) |
| Melt Flow Rate (dg/min) | 11 | 15 | 25 |

Discussion

TABLE 4

1) The effect of ethylene in the EP rubber component in the ICP is highlighted for achieving no break. For example, EX-2, EX-4, and EX-6 compositions with 17 wt % EXACT ™ 4150, all show low RTNI and complete break, while EX-8 shows no break RTNI, which is unexpected and desired for high MFR products.
2) An ethylene level of less than 50 wt % is desirable for the EP rubber component for the ICP, for achieving balanced properties after blending with the plastomer at 17 wt %.
3) The combination of high flow (>25 dg/min), flexural modulus of >140 kpsi, no break Izod, and ductility up to −29° C. by instrumented impact (Dynatup) at 15 miles per hour is observed with only with EX-8, and not with any other formulations.

TABLE 5

1) The effect of the comonomer in the EXACT ™ plastomer is highlighted. The formulations EX-10 and EX-12 have the same level of the plastomer namely 17 wt %, similar to EX-8 (Table 5). However, the RTNI for EX-10 and EX-12 formulations is low and complete break, while that for EX-8 is no break Izod, and this is unexpected.
2) In addition, the failure mode for Gardner impact strength at −29° C. for formulations EX-10 and 12 is mixed, namely ductile-brittle and ductile, while that for EX-8 is completely ductile. Similar behavior is observed for EX-12 under instrumented impact at −18° C. in comparison to EX-8.

TABLE 6

1) The combination of ethylene in the EP rubber component in the ICP made with a different catalyst (SP-506F) and the EXACT ™ 4150 at a level of 17 wt % is shown to give, unexpectedly well balanced properties in EX-15.
2) Well balanced properties - flexural modulus >140 kpsi, no break Izod impact, ductility at −29° C. by instrumented impact measured at 15 miles per hour.

TABLE 7

Paintability Data

The paintability using a standard 1K/2K system with EX-8 is shown to be "excellent" by the standard testing protocols used for evaluating durability of the paint system.

TABLE 8

Aggressive Adhesion Test for Example 8 vs. Competitive Products

The aggressive adhesion system with EX-8 is shown to be excellent in comparison to lower flexural modulus commercially available products - Montell CA 186 (Montell Polyolefins) and Solvay D-160 (Solvay Engineered Polymers). The flexural modulus for CA 186 and D-160 are around 90–110 kpsi, whereas EX-8 has a flexural modulus of >150 kpsi and shows unexpected paintability and durability. Further, the MFR is advantageously higher for EX-8 relative to the commercially available products. In an embodiment of the blend, the MFR is >12 dg/min. in one embodiment, >15 dg/min. in another embodiment, while in yet another embodiment the MFR is from 15 to 28 dg/min.

The impact copolymer and plastomer blend can be used in a number of articles where a smooth, paintable surface is desired. Any method common in the art may be used to form or inject the blend to form the articles of the various embodiments. Uses for the embodiments of the invention are automotive, aeronautical and nautical instrument panels, automotive bumpers and bumper fascia, automotive grills, side cladding and molding, automotive end caps, step pads, sill plates, wheel flares, fender liners, glove boxes, knee bolsters, valence panels and air dams. In general, embodiments of the invention are useful in articles such as in mold lamination, co-injection molding, gas-assisted parts, and pillar trim with polypropylene over-molded with thermoplastic polyolefins. Embodiments of the invention can also be used in bed liners, rocker panels, mud flaps, running boards, hub caps, and other external automotive uses. For external uses, it is desirable to add a UV stabilizer such as Tinuven 791 (CIBA Specialty Chemicals) or Uvasil 2000 HM or LM (Great Lakes Chemicals), both silicon based compositions. Also, for scratch resistance, it is advantageous to add siloxane based compositions such as MB350–001 and/or MB50–321 (Dow Corning Corporation). Non-automotive applications of embodiments of the invention are such articles as child car seats, boosted chairs, safety helmets, and lawn furniture.

We claim:

1. A paintable polymeric article comprising a blend of an impact copolymer and an ethylene/hexene plastomer, comprising;
   (a) the impact copolymer having between 95 and 78 wt % homopolypropylene and between 5 and 22 wt % of ethylene-propylene rubber, wherein ethylene propylene rubber comprises less than about 50 wt % ethylene, and;
   (b) wherein the ethylene/hexene plastomer has a density in the range from 0.88 to 0.915 g/cc;
   and wherein the impact copolymer is present in the blend in a range of 95 to 70 wt % and the ethylene/hexene plastomer is present in the blend in a range from 5 to 30 wt % such that propylene, ethylene and hexene are present in the blend in respective range of 73.2 to 84.2 wt %, 14.3 to 23.1 wt % and 1.5 to 3.7 wt %.

2. The article of claim 1, wherein the MFR of the blend is from greater than 12 dg/min.

3. The article of claim 1, wherein the MER of the blend is from greater than 15 dg/min.

4. The article of claim 1, wherein the plastomer is present in the blend from 16 to 19 wt %.

5. The article of claim 1, wherein the MFR of the blend is from 15 to 28 dg/min.

6. The article of claim 1, wherein the Garder Impact strength at −29° C. is greater than 225 in-lb.

7. The article of claim 1, wherein the article is an exterior automotive component.

8. The article of claim 7, wherein the article is selected from the group comprising automotive bumpers and bumper fascia, automotive grills, side cladding and molding, automotive end caps, step pads, sill plates, wheel flares, fender liners, glove boxes, knee bolsters, valence panels and air dams.

9. The article of claim 1, wherein the melt index of the plastomer of the blend is from 0.80 to 10 dg/min.

* * * * *